US012197974B2

(12) United States Patent
Hans et al.

(10) Patent No.: US 12,197,974 B2
(45) Date of Patent: Jan. 14, 2025

(54) LOGICAL JAVA CARD RUNTIME ENVIRONMENT

(71) Applicant: Oracle International Corporation, Redwood Shores, CA (US)

(72) Inventors: Sebastian Jürgen Hans, Berlin (DE); Lucian Adrian Ungurean, Bucharest (RO)

(73) Assignee: Oracle International Corporation, Redwood Shores, CA (US)

( * ) Notice: Subject to any disclaimer, the term of this patent is extended or adjusted under 35 U.S.C. 154(b) by 319 days.

(21) Appl. No.: 17/835,848

(22) Filed: Jun. 8, 2022

(65) Prior Publication Data
US 2023/0401116 A1 Dec. 14, 2023

(51) Int. Cl.
*G06F 9/54* (2006.01)
(52) U.S. Cl.
CPC ................... *G06F 9/546* (2013.01)
(58) Field of Classification Search
CPC ........................................ G06F 9/546
See application file for complete search history.

(56) References Cited

U.S. PATENT DOCUMENTS

| 10,063,375 | B2 | 8/2018 | Thom et al. | |
|---|---|---|---|---|
| 10,084,604 | B2 | 9/2018 | Burghardt et al. | |
| 2006/0085848 | A1* | 4/2006 | Aissi | H04L 63/0869 726/9 |
| 2007/0207798 | A1* | 9/2007 | Talozi | H04W 24/06 455/423 |
| 2008/0147508 | A1 | 6/2008 | Liu et al. | |

(Continued)

FOREIGN PATENT DOCUMENTS

| EP | 1566941 A1 * | 8/2005 | ......... G06K 19/0719 |
|---|---|---|---|
| GB | 2328042 A * | 2/1999 | .......... G06F 11/1474 |

(Continued)

OTHER PUBLICATIONS

Samsung R&D Institute UK, "Draft Reply LS from ETSI TC SCP about the multiple logical interfaces support", ETSI Draft; SCP(21)000112, European Telecommunications Standards Institute, Jul. 8, 2021.

(Continued)

*Primary Examiner* — Charles E Anya
(74) *Attorney, Agent, or Firm* — Invoke

(57) ABSTRACT

Techniques are disclosed for generating a message stream configured to indicate a source of the various messages within the message stream. In particular, the indicators identify which interface the messages were received at a terminal (e.g., of a mobile handset). The terminal receives messages on various interfaces, and separates the messages received via different interfaces with interface switch indicators within the message stream. In one embodiment, the smart card receives a message stream that includes sets of messages and interface switch indicators therein. The smart card delivers messages from the message stream to a single logical partition of the smart card up until an interface switch indicator is identified in the message stream. From that point, the smart card delivers messages from the message stream to a different logical partition of the smart card up until another interface switch indicator is identified in the message stream.

18 Claims, 9 Drawing Sheets

(56) References Cited

U.S. PATENT DOCUMENTS

| | | | |
|---|---|---|---|
| 2008/0230609 A1* | 9/2008 | Singh | G06F 9/4411 |
| | | | 235/441 |
| 2012/0108206 A1 | 5/2012 | Haggerty | |
| 2012/0190354 A1 | 7/2012 | Merrien et al. | |
| 2014/0123209 A1 | 5/2014 | Rajakarunanayake et al. | |
| 2014/0188713 A1 | 7/2014 | Alimi | |
| 2014/0245272 A1* | 8/2014 | Wilkinson | G06F 8/52 |
| | | | 717/148 |
| 2015/0127529 A1 | 5/2015 | Makhotin et al. | |
| 2015/0134958 A1 | 5/2015 | Merrien et al. | |
| 2015/0288686 A1 | 10/2015 | Pepin et al. | |
| 2016/0088464 A1* | 3/2016 | Hans | H04W 8/183 |
| | | | 455/558 |
| 2016/0173493 A1* | 6/2016 | Wane | H04L 63/0823 |
| 2018/0026963 A1 | 1/2018 | Ning et al. | |
| 2018/0144137 A1 | 5/2018 | Rhelimi et al. | |
| 2022/0124481 A1* | 4/2022 | Kang | H04W 12/40 |
| 2022/0159448 A1 | 5/2022 | Kang et al. | |
| 2023/0217356 A1 | 7/2023 | Cogan et al. | |

FOREIGN PATENT DOCUMENTS

| | | | | |
|---|---|---|---|---|
| WO | WO-2010089401 A2 * | 8/2010 | | H04L 51/22 |
| WO | 2015/179198 A1 | 11/2015 | | |
| WO | WO 2016030893 A2 * | 3/2016 | | H04W 4/80 |
| WO | WO-2016108096 A1 * | 7/2016 | | G06F 3/0659 |
| WO | WO 2018162117 A1 * | 3/2018 | | G06Q 20/3574 |

OTHER PUBLICATIONS

"Baseline Security Recommendations for IoT", Retrieved at https://www.enisa.europa.eu/publications/baseline-security-recommendations-for-iot, Nov. 20, 2017, 3 Pages.

"MIPI I3C and I3C Basic", Retrieved at https://www.mipi.org/specifications/i3c-sensor-specification, Retrieved on May 2022, 8 Pages.

"NIST Releases Draft Guidance on Internet of Things Device Cybersecurity", Retrieved at https://www.nist.gov/news-events/news/2020/12/nist-releases-draft-guidance-internet-things-device-cybersecurity, Retrieved on May 2022, 3 Pages.

* cited by examiner

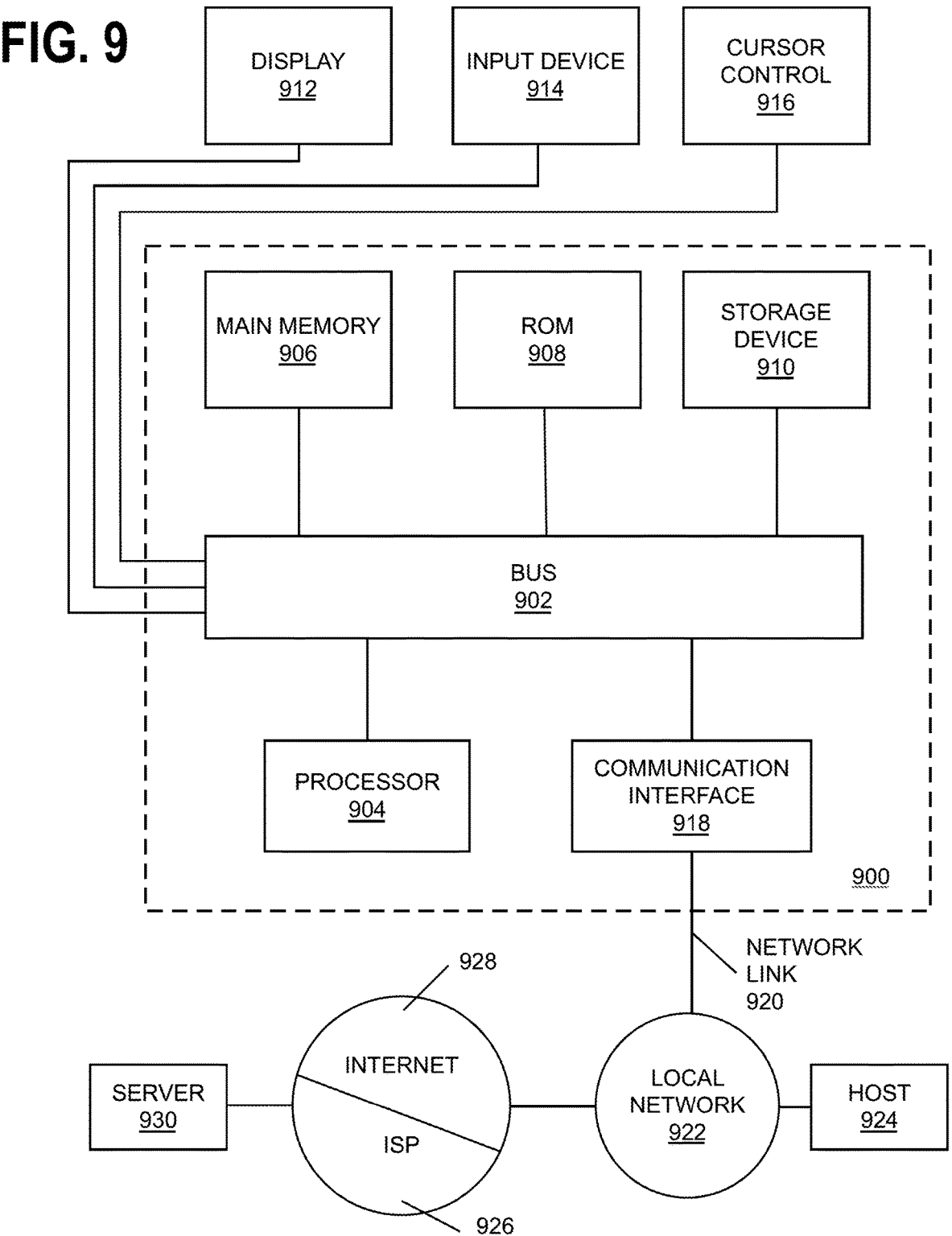

LOGICAL JAVA CARD RUNTIME ENVIRONMENT

TECHNICAL FIELD

The present disclosure relates to deploying logical Java Card runtime environments on a smart card.

BACKGROUND

Over the last decade, members of the mobile phone industry, including mobile handset manufacturers, Subscriber Identification Module (SIM) card manufacturers, and Mobile Network Operators (MNOs), have developed standards for related technologies: embedded SIM (eSIM) cards and embedded universal integrated circuit cards (eUICCs). These components, when integrated into a mobile handset, provide an interface for receiving and responding to network and handset requests. These standards define use, format, functionality, and associated profiles for the eSIM/eUICC. A secure element chip is capable of storing more than one of these profiles, but only one profile is able to be active at any given time, allowing the active profile to respond to network and/or terminal requests while inactive profile(s) are prevented from handling network and/or terminal requests.

In addition, for many years now, handset manufacturers have produced handsets that include at least one (and often multiple) physical expansion slots for using multiple removable SIM/UICCs. Integrating more than one physical slot for a SIM card is a large cost factor for the handset manufacturers, whether it is an expansion slot or an embedded physical slot.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with one or more embodiments.

DETAILED DESCRIPTION

Figure 1:
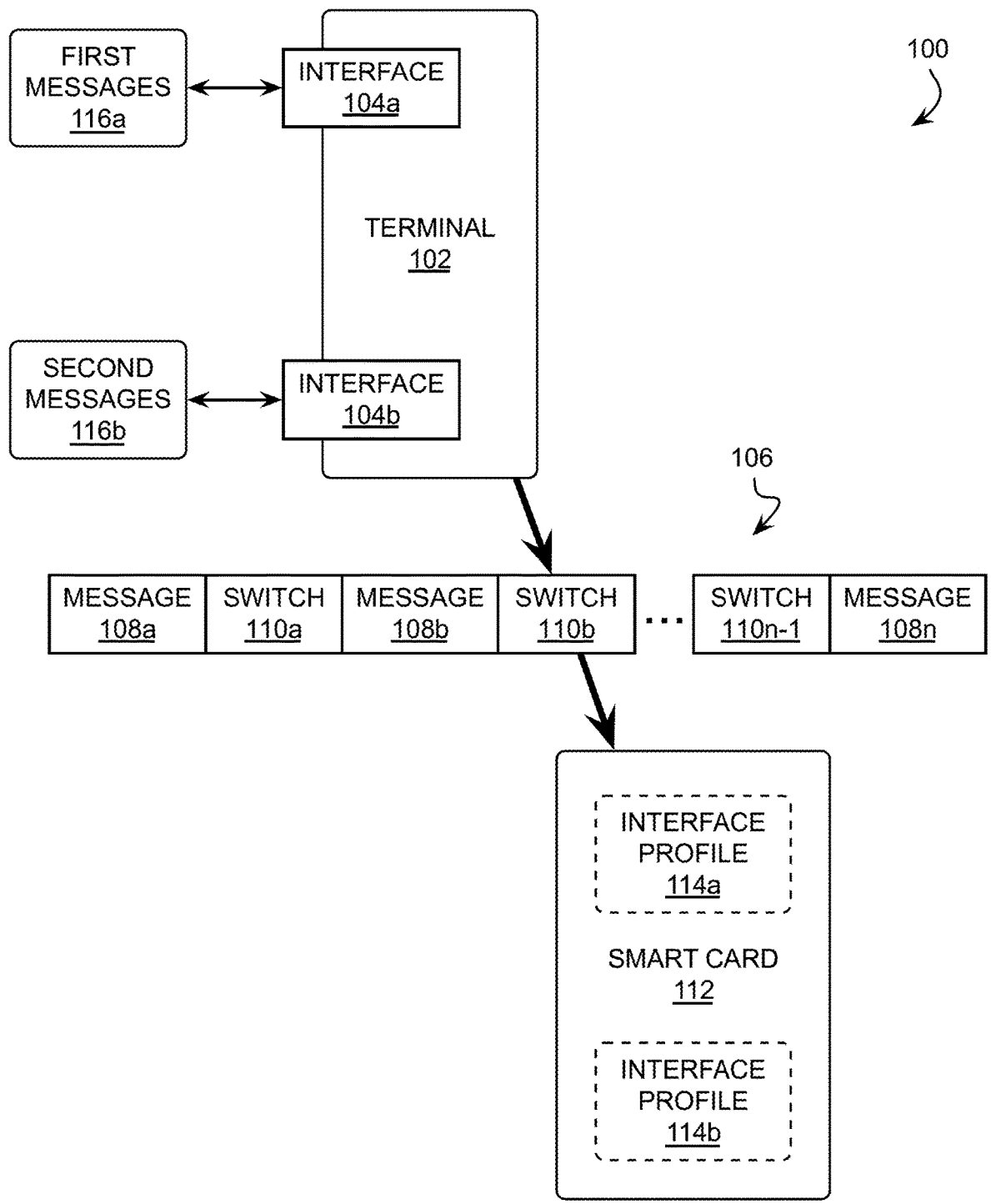
FIG. 1 illustrates a block diagram of an example system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MESSAGE DISPATCHER
4. PLATFORM REGISTRY
5. LOGICAL PARTITION SUPPORT
6. EXAMPLE EMBODIMENTS
7. COMPUTER NETWORKS AND CLOUD NETWORKS
8. HARDWARE OVERVIEW
9. MISCELLANEOUS; EXTENSIONS

1. GENERAL OVERVIEW

A terminal may be configured to receive messages from various interfaces and forward them in a same message stream. One or more embodiments generate a message stream configured to indicate a source of the various messages within the message stream without each message identifying the source. The terminal, that forwards messages received from various interfaces, inserts interface switch indicators into the message stream such that the interface switch indicators are inserted between sets of messages received from different interfaces.

In one or more embodiments, a smart card (e.g., of the mobile handset) receives a message stream that includes sets of messages and interface switch indicators therein. The smart card delivers messages from the message stream to a particular logical partition of the smart card up until an interface switch indicator is identified in the message stream. From that point, the smart card delivers messages from the message stream to a different logical partition of the smart card up until another interface switch indicator is identified in the message stream.

According to one or more embodiments, a smart card may host multiple logical partitions, each logical partition being configured to receive messages received at a certain interface of a terminal. The smart card prevents access to data corresponding to the first logical partition from any process corresponding to the second logical partition while also preventing access to data corresponding to the second logical partition from any process corresponding to the first logical partition.

One or more embodiments described in this Specification and/or recited in the claims may not be included in this General Overview section.

2. SYSTEM ARCHITECTURE

Mobile handset manufacturers benefit from removing physical expansion slots from mobile handsets while still allowing the mobile handsets to host multiple enabled profiles to respond to network and terminal requests. In one or more embodiments, the multiple enabled profiles may be hosted on a physical embedded secure element or smart card integrated with the mobile handset. Mobile handset manufacturers have started to define a way of hosting interface profiles (e.g., eUICC profiles) on a logical secure element that communicates over logical interfaces sharing one physical interface with the mobile handset. In this way, multiple enabled interface profiles may be active at any given time, and capable of responding to terminal and network requests of the mobile handset.

FIG. 1 illustrates a block diagram of an example system 100 in accordance with one or more embodiments. As illustrated in FIG. 1, system 100 includes a terminal 102 and a smart card 112. Terminal 102 is configured to generate a message stream 106, which is transmitted to smart card 112 in association with receiving messages 116 (e.g., first messages 116a, second messages 116b, etc.) at terminal 102. Interfaces 104 and messages 116 may include any type of data and information for processing by smart card 112, such as data commands, control commands, etc.

In one embodiment, terminal 102 may be a mobile handset, such as a mobile telephone device, or some other device configured to connect to one or more data communication networks, which may include wired and/or wireless data communication networks. Terminal 102 includes a plurality of interfaces 104 (e.g., interface 104a, interface 104b, etc.) configured to communicate via a particular data communications network. Interfaces 104 may be configured to send and/or receive data via any data communications network. Some example data communications networks include, but are not limited to, Global Systems for Mobile (GSM), Code Division Multiple Access (CDMA), Universal Mobile Telecommunication System (UMTS), Long Term Evolution (LTE), General Packet Radio Service (GPRS), Universal Mobile Telecommunications System (UMTS), Broadband Global Area Network (BGAN), wireless local area network (WLAN), Ethernet, etc.

In one or more embodiments, interface 104a may be configured to communicate using a first type of data communications network, while interface 104b may be configured to communicate using the same type of data communications network as interface 104a, or a different type of data communications network. In one embodiment, terminal 102 may include one or more interfaces 104 configured to communicate via a wired data communications network. In an embodiment, terminal 102 may include one or more interfaces 104 configured to communicate via a wireless data communications network. In one embodiment, terminal 102 may include one or more interfaces 104 configured to communicate via a satellite data communications network.

Smart card 112 may be a computing device configured to securely receive and respond to commands and/or messages across the various networks to which terminal 102 is in communication. In one embodiment, smart card 112 may be a UICC. In another embodiment, smart card may be a secure element.

In one or more embodiment, smart card 112 includes multiple interface profiles 114 (e.g., interface profile 114a, interface profile 114b, etc.). When smart card 112 is a physical UICC, each of the interface profiles 114 may be eUICC profiles, according to an approach.

Although only two interface profiles 114 are shown in FIG. 1, any number of different profiles may be supported by a single smart card 112. A maximum number of supported interface profiles 114 may be determined based on an amount of memory available to smart card 112, and a number of interfaces 104 on terminal 102. In some examples, the maximum number of supported profiles may be two, three, four, five, ten, etc.

Terminal 102 generates message stream 106 based at least on messages 116 received via interfaces 104. In some approaches, message stream 106 may include commands and/or responses from the smart card 112. The various interface profiles 114 on smart card are configured, in one or more embodiments, to process messages received on a single interface (e.g., first messages 116a received via interface 104a, second messages 116b received via interface 104b, etc.), not all messages 116 received by terminal 102. For the remainder of this discussion, interface profile 114a is assumed to be configured to process first messages 116a received by interface 104a, and interface profile 114b is assumed to be configured to process second messages 116b received by interface 104b. However, any arrangement may be used when implementing the techniques described herein, including but not limited to having more than two interface profiles 114 corresponding to more than two interfaces 104.

Message stream 106 includes a first set of messages 108a which may include one or more messages received via one of the interfaces (e.g., one or more first messages received via interface 104a) separated from the next set of messages 108b by an interface switch indicator 110a. Interface switch indicator 110a denotes that the messages included in message stream 106 prior to the interface switch indicator 110a are received via a different interface as compared to messages 108b included in message stream 106 after the interface switch indicator 110a. The next set of messages 108b are received via a different one of the interfaces (e.g., one or more second messages received via interface 104b). Messages 108b in message stream 106 are followed by another switch interface indicator 110b, denoting another switch in the interface which received the following messages. Switch interface indicators 110 are positioned between each set of messages 108 in the message stream 106 in order to group the messages 108 by the interface 104 on which they were received. In another words, message(s) 108a are selected from first messages 116a, while message(s) 108b are selected from second messages 116b, and separated by interface switch indicators 110 within all of message stream 106. If additional interfaces 104 are present on terminal 102, the interface switch indicators 110 will be configured to indicate a switch to this interface type, as well as indicating a switch to interface 104a and 104b.

Terminal 102 may place messages received via interfaces 104 into message stream 106 in sequential order according to when the messages were received at terminal 102 in one or more embodiments. In one approach, bursts of messages may be placed in message stream 106 in an attempt to minimize the number of interface switch indicators 110 that are needed to indicate switching between interfaces 104, even if one or more messages are placed in the message stream 106 out of an order of receipt at the interfaces 104. If a string or burst of messages is being received at a first interface (e.g., interface 104a), all of these messages 116a may be placed into the message stream 106 in order prior to any messages 116b received at another interface (e.g., interface 104b) until there is a break or pause in the flow of messages 116a being received at the first interface 104a. Then, any accumulated messages 116b received at the other interface 104b may be placed into the message stream 106 according to the order of receipt.

In other words, the messages 108 may be ordered within the message stream 106 in a chronological order based, at least in part, on a respective time at which each of the messages 116 are received at the terminal 102 (specifically, at the interfaces 104 of terminal 102).

For example, some of the messages 116a received in a first period of time may be grouped into a first group of messages 108a in the message stream 106. Moreover, some of the messages 116b received in a second period of time may be grouped into a second group of messages 108b in the message stream 106. In this example, a start time of the second period of time is later than a start time of the first period of time, and the first group of messages 108a are ordered prior to the second group of messages 108b in the message stream 106.

However, at least one message in the second group of messages 108b may have been received prior to at least one message in the first group of messages 108a, since the first period of time may overlap with the second period of time even though the second period of time starts after the first period of time. The amount of switching between messages received at different interfaces 104 on terminal 102 will be minimized, as much as possible, by generating bursts of messages received at one interface within the message stream 106. These bursts may have a minimum size (e.g., 10 bits, 100 bits, 10 bytes, 100 bytes, 1 KB, etc.) or duration (1 ms, 10 ms, 100 ms, 1 second, etc.) in one embodiment. In another embodiment, these bursts or strings of messages from the same interface in the message stream 106 may have a maximum size or duration to ensure that messages are not unnecessarily delayed at terminal 102 while still minimizing the number of interface switch indicators 110 utilized in the message stream 106.

Interface switch indicators 110 may be short, representational strings or codes that corresponds to one of the various interfaces 104 present on terminal 102, and which are understood by smart card 112, so that smart card 112 is able to determine which interface profile 114 to send the corresponding message(s). Interface switch indicators 110 may include a marker, flag, or some other binary mechanism that denotes a switch between interface types on terminal 102 for the next message or set of messages.

Figure 2:
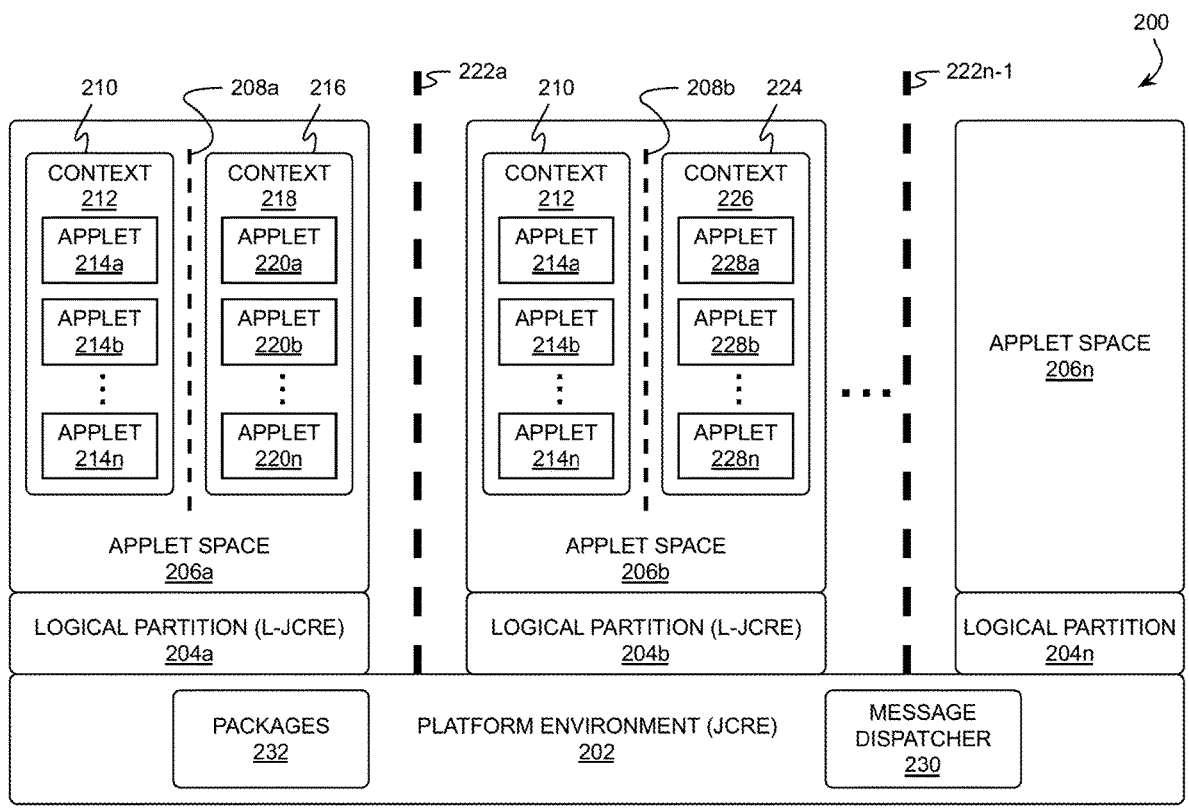
FIG. 2 illustrates an example system having multiple logical partitions hosted by a platform, in accordance with one or more embodiments.

FIG. 2 illustrates an example system 200 having multiple logical partitions 204 hosted by a platform environment 202, in accordance with one or more embodiments. The various modules show in FIG. 2 are described as being performed by a "system," but any combination of hardware and software may be utilized to perform the various functionality of the system 200 shown in FIG. 2.

System 200 includes a platform environment 202 that operates an expandable set of functions. In one or more embodiments, platform environment 202 may be implemented on a secure element, UICC, or smart card, such as smart card 112 in FIG. 1, or some other component of system 100, in order to provide appropriate portions of the message stream 106 from terminal 102 to the various interface profiles 114.

Referring again to FIG. 2, in an embodiment, platform environment 202 is configured to install, instantiate, and/or provide one or more packages to various logical partitions 204 (e.g., logical partition 204a, logical partition 204b, . . . , logical partition 204n) hosted by the platform environment 202. Any desired package(s) 232 may be installed and/or provided by platform environment 202. When the platform environment 202 is a JCRE, some example packages 232 that may be used include, but are not limited to, Java Card (JC) packages that provide core and expanded Java Card functionality for the various logical partitions 204; Global Platform (GP) packages that allow an issuer security domain (ISD) to act as an installer within a logical partition and as the root of all security domains in that logical partition; European Telecommunications Standards Institute (ETSI) packages that provide structure, format, protocols, and communication standards for UICC and SIM cards, etc.

In one or more embodiments, platform environment 202 may initialize and/or install any of the various packages on one of the logical partitions (e.g., logical partition 204a) to provide corresponding functionality to logical partition 204a without initializing and/or installing the same package on another logical partition (e.g., logical partition 204b). As shown in FIG. 2, each of the logical partitions 204 have been provided with the same package functionality, but system 200 is not limited to this embodiment, and any combination of package installation/provision across the various logical partitions 204 is possible, in one or more embodiments.

Platform environment 202 includes a message dispatcher 230 configured to determine which of the various logical partitions 204 to send messages from a message stream received by smart card. Message dispatcher 230, in one or more embodiments, may be configured to recognize interface switch indicators from the message stream in order to determine which logical partition 204 to send the next set of messages form the message stream. The message dispatcher 230 is described in more detail in FIG. 3.

Referring again to FIG. 2, in one embodiment, platform environment 202 provides and manages a partition firewall mechanism 222 which may provide firewall protection (e.g., partition firewall mechanism 222a, . . . , partition firewall mechanism 222n-1) between the various logical partitions 204 (e.g., partition firewall mechanism 222a separates logical partition 204a from logical partition 204b). Platform environment 202 operates the partition firewall mechanism 222 to completely prevent sharing of data and objects between the various logical partitions 204.

The number of logical partitions 204 that can be hosted and/or reside on platform environment 202 may be limited due to memory constraints on the secure element/smart card/UICC on which the platform environment 202 is executed. However, by using a component that has sufficient memory to host a large number of logical partitions 204 (e.g., greater than 10 such partitions), this constraint may be effectively overcome.

In one embodiment, when the platform environment 202 is a JCRE, the logical partitions 204 are logical JCREs (L-JCREs). In this embodiment, each L-JCRE provides and/or hosts an applet space 206 (e.g., applet space 206a on L-JCRE 204a, applet space 206b on L-JCRE 204b, . . . , applet space 206n on L-JCRE 204n, etc.). Each applet space 206 allows for one or more converted applet (CAP) files (e.g., CAP file 210, CAP file 216, CAP file 224) to be used. A CAP file may include one or more contexts in which a number of applets may be called and/or used. For example, CAP file 210 supports context 212 with applets 214 (e.g., applet 214a, applet 214b, . . . , applet 214n, etc.). Similarly, CAP file 216 supports context 218 with applets 220 (e.g., applet 220a, applet 220b, . . . , applet 220n, etc.). Although only a single context is shown for each CAP file, a CAP file may include multiple contexts in some embodiments. In one or more embodiments, the same CAP file may be installed and/or provided to multiple different applet spaces 206.

Applets provided by the various CAP files are separated from one another by applet firewalls 208 within a corresponding applet space 206 (e.g., applet firewall 208a separates applets 214 provided by CAP file 210 from applets 220 provided by CAP file 216 in applet space 206, applet firewall 208b separates applets 214 provided by CAP file 210 from applets 228 provided by CAP file 224 in applet space 206b, etc.). Applet firewalls 208 are security mechanisms typically implemented in a JCRE. The applet firewalls 208 each perform checks at runtime to prevent applets from accessing (reading or writing) data of other applets (i.e., of applets in a different security context). For every object, its context is recorded, and for any field or method access, the applet firewall 208 checks if it is allowed. In other words, applets are only allowed to access data and objects in their own context, or by using an object sharing mechanism, while the platform environment (e.g., JCRE) has the ability to access anything within system 200. In addition, each logical partition (e.g., L-JCRE) has a context and is able to access anything in that context.

In one or more embodiments, platform environment 202 supports a fixed number or a variable number of logical interfaces (e.g., corresponding to the number of interfaces 104 on terminal 102). A same number of logical partitions 204 are enabled by platform environment 202, on a one-to-one basis to the number of interfaces 104. In one or more embodiments, terminal 102 and/or platform environment 202 may determine a default logical interface that is opened after a smart card/UICC/SIM card reset.

In one or more embodiments, platform environment 202 manages and handles all commands and/or messages that are configured/defined for managing the logical interfaces (e.g., open, switch, reset). When a logical interface is in use, all commands and/or messages in a message stream 106 will be forwarded to the logical partition 204 that is associated to the active logical interface (e.g., when interface 104a is in use, all messages in message stream 106 will be forwarded to interface profile 114a corresponding to a logical interface represented by logical partition 204a). Once delivered to the appropriate interface profile 114, the commands and/or messages will be handled according to existing rules of the packages installed on the logical partition 204 associated with the interface profile 114 (e.g., rules in the Java Card specification).

Additional embodiments and/or examples relating to computer networks are described below in the section titled "Computer Networks and Cloud Networks."

In one or more embodiments, one or more components of system 100 and/or system 200 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, system 100 and/or system 200 may include a data repository (not shown in FIGS. 1 and 2). A data repository is any type of storage unit and/or device (e.g., a file system, database, collection of tables, and/or any other storage mechanism) for storing data. The data repository may include multiple different storage units and/or devices. The multiple different storage units and/or devices may or may not be of the same type or located at the same physical site. The data repository may be implemented or executed on the same computing system as one or more other components illustrated in FIGS. 1 and 2 and/or on a separate computing system. The data repository may be communicatively coupled to one or more other components via a direct connection or via a network. Information may be implemented across any of the components of the platform other than the data repository.

In one or more embodiments, system 100 and/or system 200 may include a user interface. A user interface refers to hardware and/or software configured to facilitate communications between a user and one or more components of system 100 and/or system 200. The interface renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms. Different components of the interface may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface may be specified in one or more other languages, such as Java, Python, C, or C++.

3. MESSAGE DISPATCHER

Figure 3:
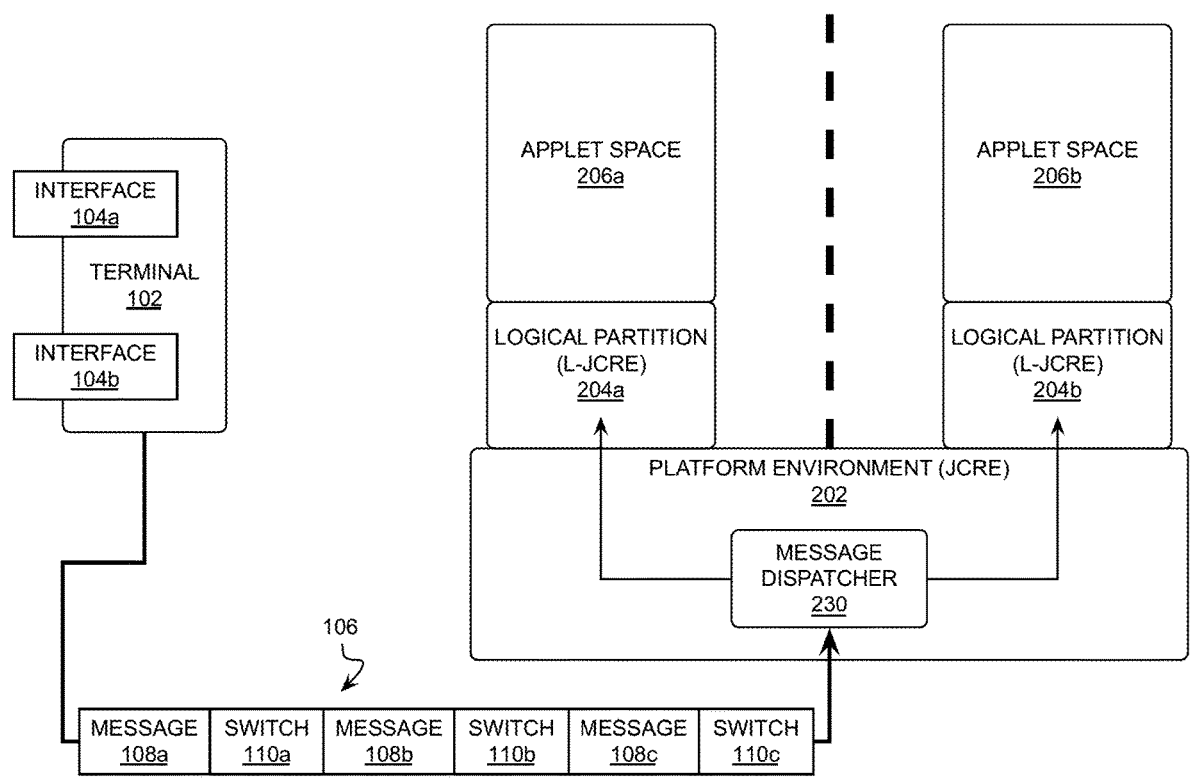
FIG. 3 illustrates use of a message dispatcher by a runtime environment, in accordance with one or more embodiments.

FIG. 3 illustrates use of a message dispatcher 230 by a platform environment 202, in accordance with one or more embodiments. Platform environment 202 operates and manages the message dispatcher 230 in order to properly direct commands and/or messages from a message stream 106 to their intended destination, which in some embodiments is based on which logical interface 104 received the message(s) at the terminal 102.

In one embodiment, message dispatcher 230 analyzes a message stream 106 and directs each message, instruction, request, and/or command included in message stream 106 to a logical partition 204 via a logical secure-element interface (LSI). Each LSI logically couples the terminal 102 with one of the logical partitions 204 within the platform environment 202. which corresponds to a particular logical interface (e.g., directs messages to logical partition 204a responsive to logical interface 104a being the particular logical interface). The messages are sent to this particular logical interface until an interface switch indicator 110 is read from message stream 106. Once the interface switch indicator 110 is identified, message dispatcher 230 determines the next logical partition 204 to send a next set of messages from message stream 106. In other words, the next set of messages in message stream 106 are sent to logical partition 204b which corresponds to logical interface 104b indicated by the interface switch indicator 110 when the previous messages were directed to logical partition 204a which corresponds to logical interface 104a.

In one embodiment, when there are only two logical partitions 204, an interface switch indicator 110 may be a simple flag or marker that indicates to switch to the other logical partition for directing messages that follow the interface switch indictor 110 in message stream 106.

In another embodiment, when more than two logical interfaces 104 exist on terminal 102, which correspond to more than two logical partition 204, then an interface switch indicator 110 may designate which logical interface 104 received the messages that will follow and/or an associated logical partition 204, so that the following messages may be directed to the appropriate logical partition 204 that will handle the messages for the particular logical interface 104. Platform environment 202 and/or message dispatcher 230 may identify and maintain correlations between logical interfaces 104 on terminal 102 and interface profiles 114 in the smart card 112 corresponding to logical partitions 204, in one or more embodiments. These correlations may be stored to memory that is accessible to the platform environment 202 and/or smart card 112.

In an embodiment, smart card 112 may receive message stream 106 that includes multiple messages 108 and interface switch indicators 110 dispersed therein. The message dispatcher 230 transmits a first subset of messages 108a from message stream 106 to a first logical partition (e.g., logical partition 204a) of the smart card 112. Prior to receiving the message stream 106, terminal 102 orders the first subset of messages 108a in the message stream 106 to be received at message dispatcher 230 prior to a first interface switch indicator 110a. Responsive to the message dispatcher 230 detecting the first interface switch indicator 110a in the message stream, message dispatcher 230 transmits a second subset of messages 108b in the message stream 106 to a second logical partition (e.g., logical partition 204b) of the smart card 112. Prior to receiving the message stream 106, terminal 102 orders the second subset of messages 108b in the message stream 106 between the first interface switch indicator 110a and a second interface switch indicator 110b. In response to message dispatcher 230 detecting the second interface switch indicator 110b in the message stream 106, message dispatcher 230 transmits a third subset of messages 108c in the message stream 106 to the first logical partition 204a of the smart card 112. As shown, the third subset of messages 108c are ordered in the message stream 106 by terminal 102 between the second interface switch indicator 110b and a third interface switch indicator 110c. This switching back and forth between delivering messages to the first logical partition 204a and second logical partition 204b will continue as the message dispatcher 230 processes through the message stream 106.

When more than two logical partitions 204 are present on platform environment 202, message dispatcher 230 will analyze the various interface switch indicators 110 included in the message stream 106 to determine which logical partition 204 to transmit the next subset of messages in the message stream 106, up until a next interface switch indicator 110 is identified.

4. PLATFORM REGISTRY

Figure 4:
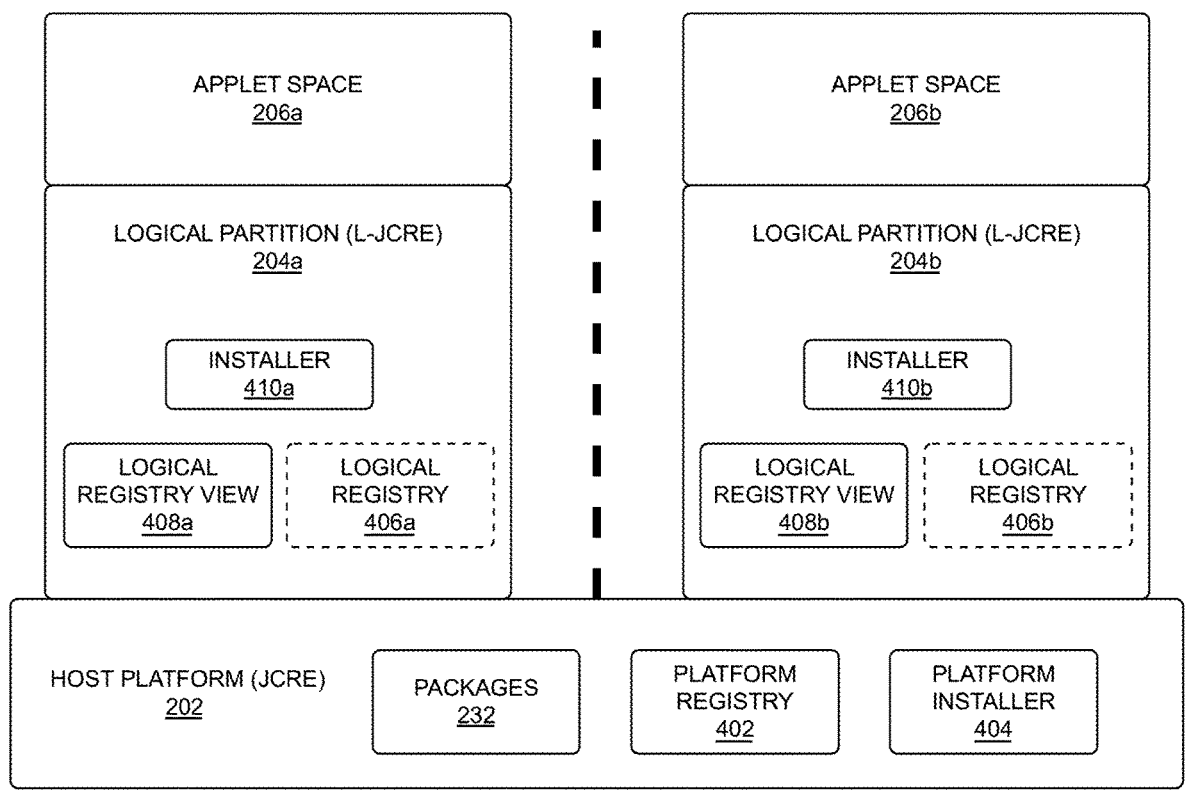
FIG. 4 illustrates use of a platform registry by a runtime environment, in accordance with one or more embodiments.

FIG. 4 illustrates use of a platform registry 402 by a platform environment 202, in accordance with one or more embodiments. The platform environment 202 maintains a platform registry 402 that includes, in a format readable by platform environment 202, descriptions of all packages 232 resident on platform environment 202 in an embodiment. In addition, every package 232 installed on the logical partitions 204 are included in the platform registry 402. When the platform environment 202 is a JCRE and the logical partitions are L-JCREs, the packages 232 available may include, but are not limited to, JC packages, GP packages, ETSI packages, etc. Platform environment 202 is configured to selectively make any or all of these various packages 232 available to the various logical partitions 204.

A logical partition 204 behaves at the applet level in the applet space 206 and to external devices like an existing platform environment (e.g., a logical partition acts and appears like a platform environment). When the platform environment 202 is a JCRE, each of the logical partitions 204 are L-JCREs that appear like their own JCREs to other devices. The platform JCRE 202 tracks which logical interface is active at any given time. By "active" interface, what is meant is that the message dispatcher 230 is presently and actively directing messages to this logical interface, and not to some other "inactive" logical interface. The active interface may be determined based on some default setting or based on a received message indicating which interface is the active interface (e.g., an interface switch indicator). Also, in one or more embodiments, the platform JCRE 202 isolates the different L-JCREs 204, so that the platform JCRE 202 operating with any given L-JCRE 204 behave like a single JCRE instance on a chip. Each L-JCRE 204 is associated with a logical interface, and this connection is maintained by the platform JCRE 202.

According to one embodiment, each logical partition (e.g., L-JCRE) 204 has a dedicated logical registry 406 (e.g., logical partition 204a has logical registry 406a, logical partition 204b has logical registry 406b). In this embodiment, each logical registry view 408 (e.g., logical registry view 408a on logical partition 204a, logical registry view 408b on logical partition 204b) may be obtained as a merge between the platform registry 402 and the corresponding dedicated logical registry 406 on the logical partition. In this approach, the platform registry 402 includes the packages for the platform environment 202 (e.g., P-JCRE packages) and not any of the packages for the logical partitions 204 (e.g., L-JCRE packages).

In one or more embodiments, the platform environment 202 (e.g., platform JCRE) has a platform registry 402 with tags denoting which entries are applicable to which logical partition 204 (e.g., L-JCRE). Each logical registry view 408 may be obtained by filtering entries from entries in the platform registry 402 according to the tags. For example, entries tagged with an identifier corresponding with a particular logical partition 204 (e.g., L-JCRE) or tagged with an identifier that is assigned to the platform environment 202 (e.g., platform JCRE) may be made available and/or downloaded into the logical registry view 408. This ensures that all common registry entries assigned to the platform environment 202 and logical partition-specific entries are included in the logical registry view 408.

Each logical partition 204 relies on the local logical registry view 408 to determine which packages 232 resident on platform environment 202 may be needed and/or used by the logical partition 204 to perform some task or operation, in order to get that package and/or installed on the logical partition 204. In one embodiment, installer 410a on logical partition 204a is used to install all packages for logical partition 204a. Installer 410a may be an instance of platform installer 404 and/or provided by host platform 202 based on platform installer 404. Similarly, in one embodiment, installer 410b on logical partition 204b may be used to install all packages on logical partition 204b. Installer 410b may be an instance of platform installer 404 and/or provided by host platform 202 based on platform installer 404.

Every L-JCRE 204 has an installer 410 as the root of all installed packages and applet instances in that L-JCRE 204. In cases where an L-JCRE 204 implements Global Platform, it has an issuer security domain (ISD) as the installer and acting as the root of all security domains in that L-JCRE 204.

Every package 232 that is loaded and applets that are installed in applet space 206 for a particular L-JCRE 204 are only associated with the installer 410 or the ISD of this L-JCRE 204 (e.g., installer/ISD 410 on L-JCRE 204a). The registry of the L-JCRE 204 that the ISD can see and that an applet can access, is a combination of the package registry of the platform JCRE 202 and the package, and the applet's instance registry of the L-JCRE 204. In this way, it is possible to have in an L-JCRE 204 an applet instance or package with the same applet identifier (AID) as in a second L-JCRE 204.

5. LOGICAL PARTITION SUPPORT

Figure 5:
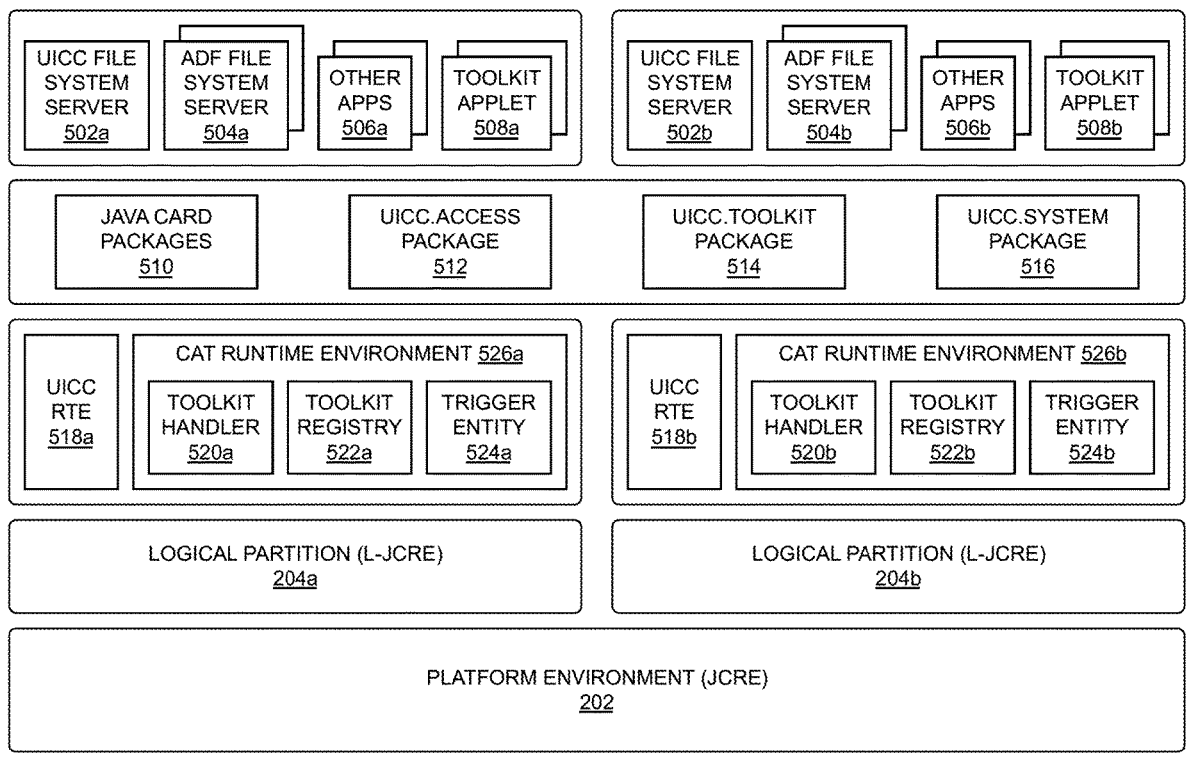
FIG. 5 illustrates an example system that supports logical partitions, in accordance with one or more embodiments.

FIG. 5 illustrates an example system 500 that supports logical partitions, in accordance with one or more embodiments. System 500 includes the platform environment (e.g., JCRE) 202 on which a plurality of logical partitions (L-JCREs) 204a, 204b, etc., are supported. Each logical partition 204 operates its own card application toolkit (CAT) Runtime Environment (CAT-RTE) 526 (e.g., CAT RTE 526a on L-JCRE 204a, CAT RTE 526b on L-JCRE 204b, etc.) and UICC Runtime Environment (UICC RTE) 518 (e.g., UICC RTE 518a on L-JCRE 204a, UICC RTE 518b on L-JCRE 204b, etc.). Above these layers, a number of packages are supported for implementation in each of the logical partitions 204. These packages include, but are not limited to, various Java Card Packages 510, the UICC.Access Package 512, the UICC.Toolkit Package 514, and the UICC.System Package 516.

Above this layer, each logical partition 204 also operates a file system and various applications/packages. For example, in FIG. 5, each logical partition 204 is running a UICC file system server 502 (e.g., UICC file system server 502a on L-JCRE 204a, UICC file system server 502b on L-JCRE 204b, etc.), some applications based on ETSI 102 221 (such as SIM applet, USIM applet, etc.) along with an ADF file system server 504 (e.g., ADF file system server 504a on L-JCRE 204a, ADF file system server 504b on L-JCRE 204b, etc.), some other applications 506 (not based on ETSI 102 221) (e.g., other apps 506a on L-JCRE 204a, other apps 506b on L-JCRE 204b, etc.), and a toolkit applet 508 (e.g., toolkit applet 508a on L-JCRE 204a, toolkit applet 508b on L-JCRE 204b, etc.) such as toolkit service, remote management applications, browser applications, etc.

If an L-JCRE 204 also implements the CAT RTE 526 according to ETSI standards, it also maintains a logical Toolkit Registry 522, that is responsible to store the terminal profile, the event-list, and all other toolkit specific data related to the logical interface associated with that L-JCRE 204. The combination of the UICC RTE 518 and CAT RTE 526 comprises a logical interface for a particular logical partition 204 in one or more embodiments. For example, UICC RTE 518a and CAT RTE 526a which includes Toolkit handler 520a, Toolkit registry 522a, and trigger entity 524a comprise the logical interface for logical partition (L-JCRE) 204a.

Each UICC RTE 518 store the Terminal Profile that it has received via an associated LSI, stores all the toolkit registry events that applets have registered on the associated L-JCRE 204, and makes the handler available to the applets on the L-JCRE 204 if the associated LSI is the currently opened interface by the terminal 102. An LSI is a logical connection between an endpoint in the terminal and one logical partition 204 within the platform environment 202.

The file system of the secure element/smart card/UICC and how it is partitioned and associated with the logical interfaces is exposed to the CAT-RTE 526 and corresponding file system API. However, this information, in one approach, will not be visible to the application layer. The CAT-RTE 526, as an extension to the platform JCRE 202, ensures that an applet on a L-JCRE 204 only has access to the file system portion that is associated with the corresponding logical interface.

On a UICC, each L-JCRE 204 and its specific extension of the CAT-RTE 526 will ensure that FileView object can only access files that are associated by the UICC operating system to the same logical interface that the L-JCRE 204 is associated with. Global objects and so called "JCRE entry point objects" (like File View, Handlers, APDU buffer) are visible only in the context of its associated L-JCRE 204. Therefore, in one embodiment, the platform JCRE 202 tracks which applet from which L-JCRE 204 is accessing a particular object and ensures that these particular objects are allocated on the platform JCRE level.

In another embodiment, particular objects are created for the L-JCRE 204 and only under the control of the L-JCRE 204 relieving the platform JCRE 202 from needing to track such interactions. The same applies with objects that the applets create and store persistently (e.g., crypto-keys, block-chain keys, encryption keys, etc.). The platform JCRE 202 ensures that only an applet from the same L-JCRE 204 can access this sensitive data, such as by utilizing partition firewalls.

During any time interval in which no communication occurs (message stream 106 is empty, connection is interrupted, etc.) over a logical interface, the L-JCRE 204 will behave like a card that waits for the next command. The L-JCRE 204 stores the context of the L-JCRE 204 at the time it has sent the Status Word of the last response APDU, which applets are selected, the state of PIN's, etc. The context of the File View and the state of the Toolkit Registry is also preserved during a LSI switch.

5. EXAMPLE EMBODIMENTS

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 6:
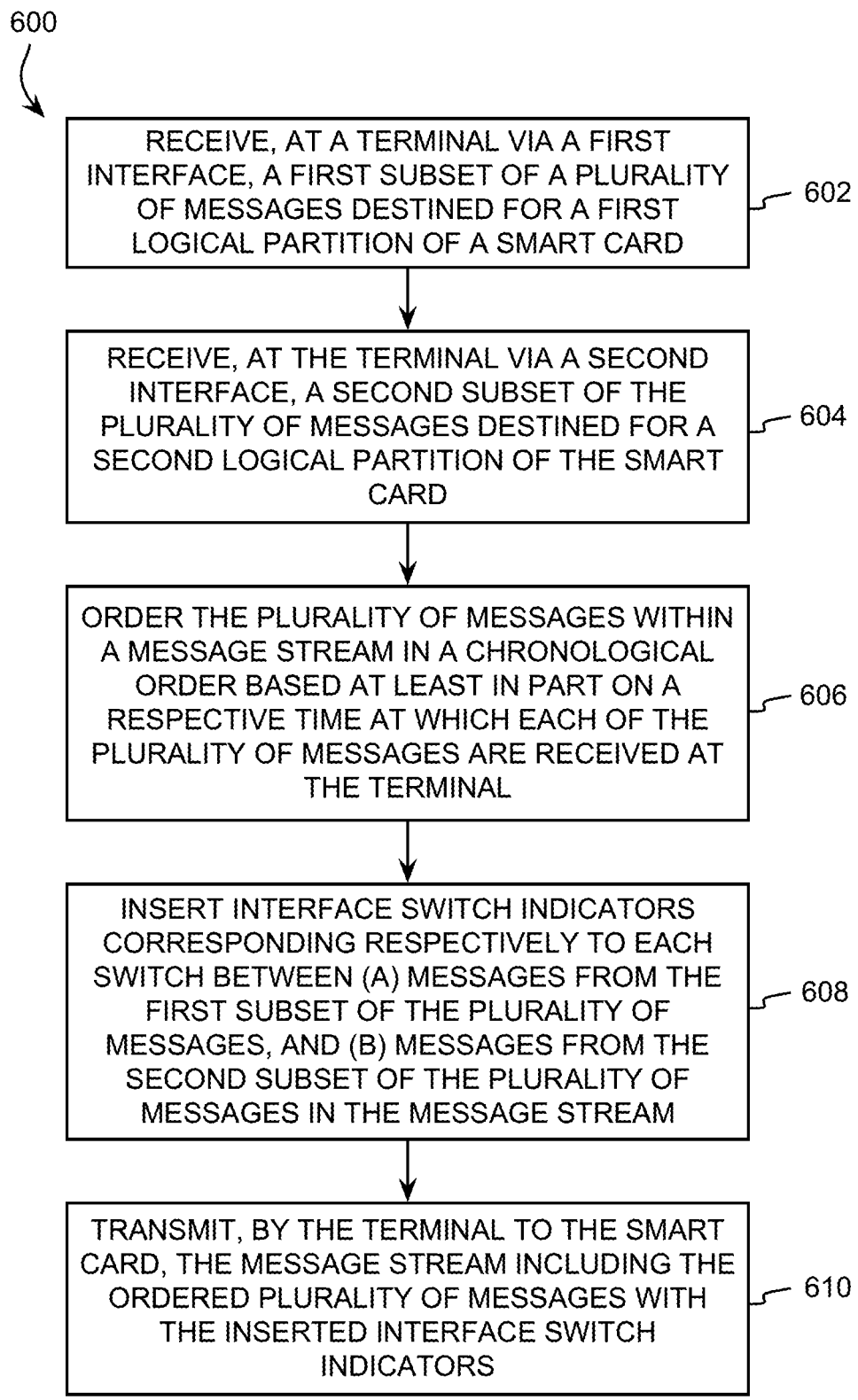
FIG. 6 illustrates an example set of operations for generating a message stream for multiple logical partitions of a smart card, in accordance with one or more embodiments.

FIG. 6 illustrates an example set of operations 600 for generating a message stream for multiple logical partitions of a smart card, in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments. Although the operations are described in FIG. 6 as being executed by a system, any hardware, software, or combination thereof may be used to execute the set of operations 600 in one or more embodiments.

In Operations 602 and 604, the system receives a plurality of messages at a terminal. In Operation 602, the system receives, at the terminal via a first interface, a first subset of the plurality of messages destined for a first logical partition of a smart card. The logical partitions of the smart card may be L-JCRE, as described herein in various embodiments. Moreover, the smart card may be a UICC, secure element, or some other communications chip device.

In Operation 604, the system receives, at the terminal via a second interface, a second subset of the plurality of messages destined for a second logical partition of the smart card. The first and second interfaces may be wireless interfaces, wired interfaces, or direct connections with another component of the system, in various embodiments.

In one or more embodiments, the first logical partition may correspond to a first subscriber identification module (SIM) card profile and the second logical partition may correspond to a second SIM card profile.

According to some embodiments, the first logical partition may correspond to a first application executing on the smart card and the second logical partition may correspond to a second application executing on the smart card.

In an approach, the first and second partitions may correspond to a mix of different entities on the smart card, including SIM card profiles, applications, UICC profiles, secure element profiles, L-JCREs, etc.

In one or more embodiments, the smart card may be a UICC, an integrated smart card for a mobile handset, a removable smart card for a mobile handset, or some other suitable device described herein.

In Operations 606 and 608, the system generates a message stream that includes the plurality of messages. In Operation 606, the system orders the plurality of messages within the message stream in a chronological order based at least in part on a respective time at which each of the plurality of messages are received at the terminal. Although strict chronological order of the messages is not required within the message stream, it is one of the considerations in determining the order for the messages in the message stream. Other considerations include minimizing the number of interface switch indictors, reduction in resource use to generate and/or process the message stream, etc.

In Operation 608, the system inserts interface switch indicators corresponding respectively to each switch between (a) messages from the first subset of the plurality of messages, and (b) messages from the second subset of the plurality of messages in the message stream. In this way, each time the destination for the messages in the message stream is changed, an interface switch indicator is inserted in the message stream to make a receiving device aware of this change.

According to one or more embodiments, the system may order the plurality of messages within the message stream in the chronological order by the following: grouping messages, from the first subset of the plurality of messages, received in a first period of time into a first group of messages; grouping messages, from the second subset of the plurality of messages, received in a second period of time into a second group of messages, wherein a start time of the second period of time is later than a start time of the first period of time; ordering the first group of messages prior to the second group of messages in the message stream, wherein at least one message in the second group of messages was received prior to at least one message in the first group of messages.

To avoid excessive back and forth and/or excessive interface switch indicators being included in the message stream, some grouping may be performed that supersedes strict chronological ordering of the messages. In one embodiment, the system may group messages together in sets of receipt time from one of the interfaces of the terminal, even when the receipt time periods for the different interfaces overlap.

For example, all messages received from 10 ms to 20 ms on the first interface may be added to the first subset of messages and sent to the smart card prior to all messages received from 15 ms to 25 ms on the second interface, which would be added to the second subset of messages. In this example, a message received in the second subset at 15 ms is sent later than a message received the first subset at 17 ms, but it prevents numerous interface switch indicators from being added to the message stream to switch all messages received from 15 ms to 20 ms across both interfaces.

In Operation 610, the system transmits, by the terminal, the message stream that includes the ordered plurality of messages with the inserted interface switch indicators to the smart card.

Operations 600 may further include, once the message stream is generated and transmitted to the smart card, any of the following operations: the smart card receives the message stream comprising the ordered plurality of messages with the inserted interface switch indicators; transmitting a first group of the first subset of the plurality of messages to the first logical partition, the first group of the first subset of messages being ordered in the message stream prior to a first interface switch indicator; responsive to detecting the first interface switch indicator in the message stream: transmitting a first group of the second subset of messages in the plurality of messages to the second logical partition, the first group of the second subset of messages being ordered in the message stream between the first interface switch indicator and a second interface switch indicator; and responsive to detecting the second interface switch indicator in the message stream: transmitting a second group of the first subset of messages in the plurality of messages to the first logical partition, the second group of the first subset of messages being ordered in the message stream between the second interface switch indicator and a third interface switch indicator.

Figure 7:
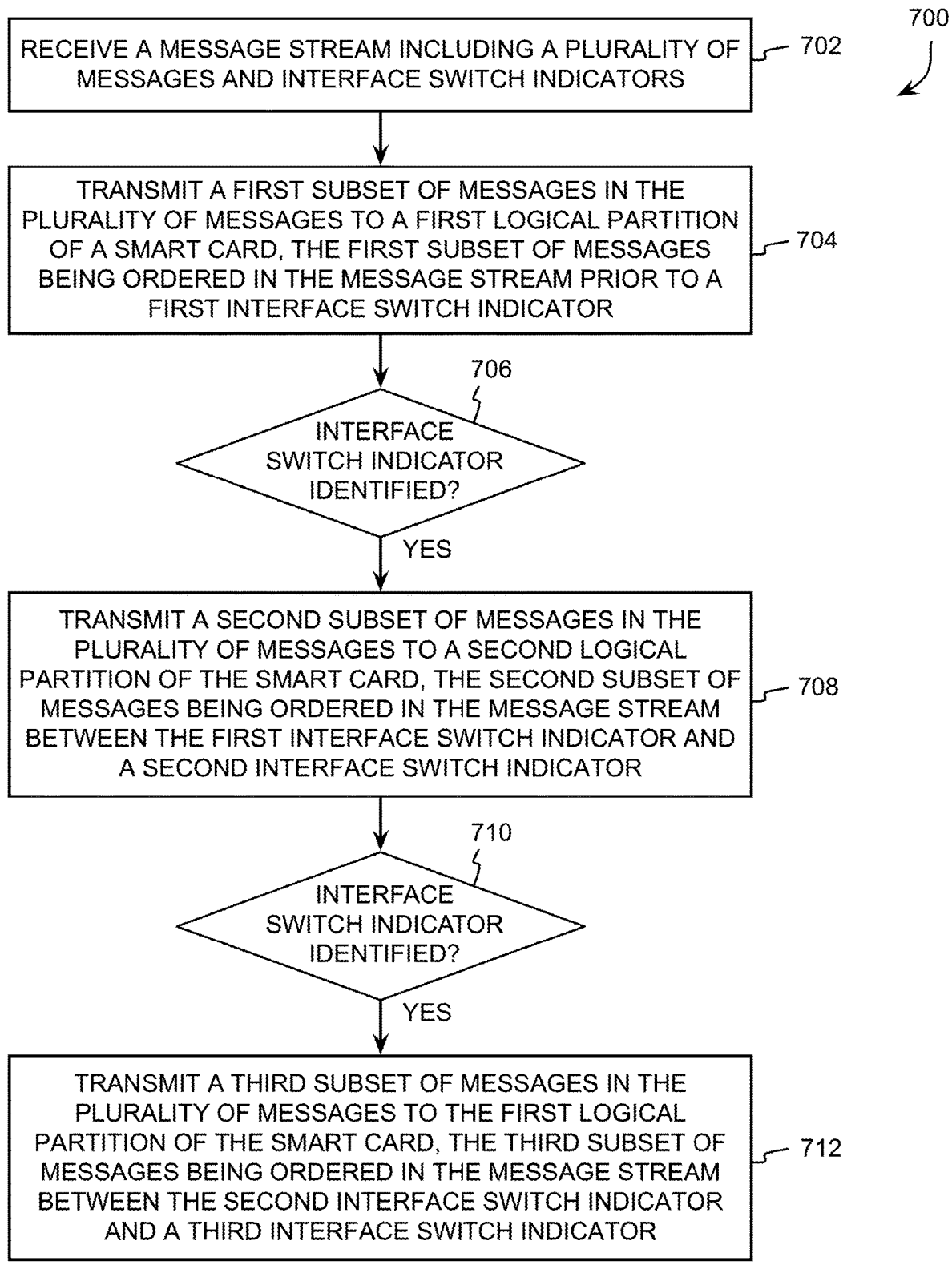
FIG. 7 illustrates an example set of operations for processing a message stream for multiple logical partitions of a smart card, in accordance with one or more embodiments.

FIG. 7 illustrates an example set of operations 700 for processing a message stream for multiple logical partitions of a smart card, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments. Although the operations are described in FIG. 7 as being executed by a system, any hardware, software, or combination thereof may be used to execute the set of operations 700 in one or more embodiments.

In Operation 702, the system receives a message stream that includes a plurality of messages and interface switch indicators. The message stream may be generated by a terminal of a mobile handset in one embodiment. Each interface switch indicator in the message stream denotes a change in which interface received the following messages in the message stream.

In Operation 704, the system transmits a first subset of messages in the plurality of messages to a first logical partition of a smart card, the first subset of messages being ordered in the message stream prior to a first interface switch indicator.

In Operation 706, the system identifies a first interface switch indicator in the message stream. Should no interface switch indicators be identified in the message stream, then the messages will continue to be transmitted to the first logical partition of the smart card. In response to detecting the first interface switch indicator in the message stream, in Operation 708 the system transmits a second subset of messages in the plurality of messages to a second logical partition of the smart card. The second subset of messages is ordered in the message stream between the first interface switch indicator and a second interface switch indicator.

In Operation 708, the system identifies a second interface switch indicator in the message stream. Should no interface switch indicators after the first interface switch indicator be identified in the message stream, then the messages will continue to be transmitted to the second logical partition of the smart card. In response to detecting the second interface switch indicator in the message stream, in Operation 710 the system transmits a third subset of messages in the plurality of messages to the first logical partition of the smart card. The third subset of messages is ordered in the message stream between the second interface switch indicator and a third interface switch indicator.

According to one or more embodiments, the first logical partition may correspond to a first SIM card profile and the second logical partition may correspond to a second SIM card profile.

According to some embodiments, the first logical partition may correspond to a first application executing on the smart card and the second logical partition may correspond to a second application executing on the smart card.

In an approach, the first and second partitions may correspond to a mix of different entities on the smart card, including SIM card profiles, applications, UICC profiles, secure element profiles, L-JCREs, etc.

In one or more embodiments, the smart card may be a UICC, an integrated smart card for a mobile handset, a removable smart card for a mobile handset, or some other suitable device described herein.

In one or more embodiments, the system may receive, at a terminal (e.g., of a mobile handset), the plurality of messages, which includes receiving, via a first interface, a first group of the plurality of messages destined for the first logical partition of the smart card and receiving, via a second interface, a second group of the plurality of messages destined for the second logical partition of the smart card. The system may generate the message stream comprising the plurality of messages by ordering the plurality of messages within the message stream in a chronological order based at least in part on a respective time at which each of the plurality of messages are received at the terminal and inserting interface switch indicators corresponding respectively to each switch between (a) messages from the first group of the plurality of messages, and (b) messages from the second group of the plurality of messages in the message stream. Thereafter, the system may transmit, by the terminal to the smart card, the message stream comprising the ordered plurality of messages with the inserted interface switch indicators.

Figure 8:
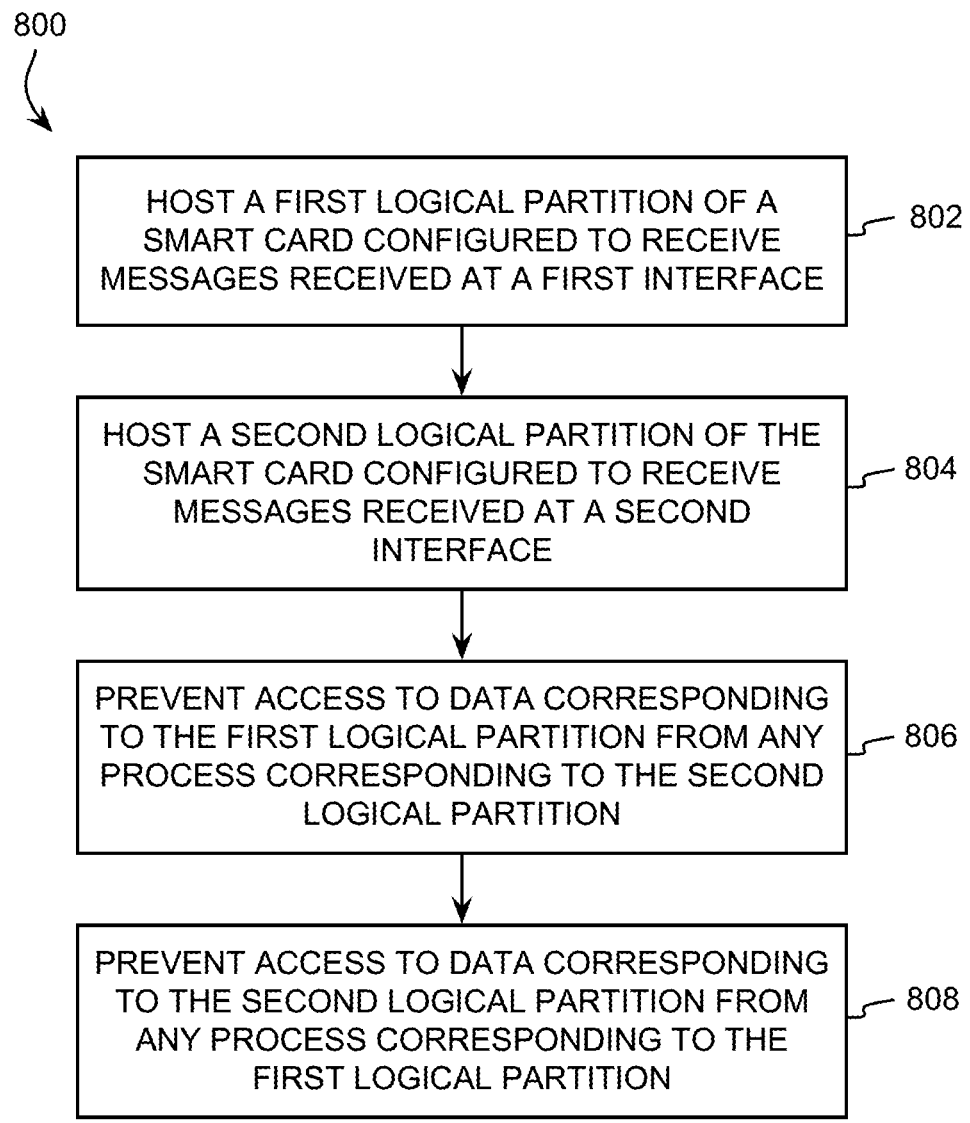
FIG. 8 illustrates an example set of operations for applying partition firewalls to multiple logical partitions of a smart card, in accordance with one or more embodiments.

FIG. 8 illustrates an example set of operations 800 for applying partition firewalls to multiple logical partitions of a smart card, in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments. Although the operations are described in FIG. 8 as being executed by a system, any hardware, software, or combination thereof may be used to execute the set of operations 800 in one or more embodiments.

In Operation 802, the system hosts a first logical partition of a smart card configured to receive messages received at a first wireless interface (e.g., of a terminal of a mobile handset).

In Operation 804, the system hosts a second logical partition of the smart card configured to receive messages received at a second wireless interface.

In Operation 806, the system prevents access to data and processes corresponding to the first logical partition from any process corresponding to the second logical partition, e.g., applies a partition firewall between the first and second logical partitions. Additional partition firewalls may be applied between all other logical partitions of the smart card.

In Operation 808, the system prevents access to data corresponding to the second logical partition from any process corresponding to the first logical partition.

In one or more embodiments, the system may also maintain a registry of platform packages for a JCRE, e.g., Java Card, GlobalPlatform, ETSI, etc. In addition, the system may selectively perform operations corresponding to at least one first platform package from the registry of platform packages for the first logical partition and/or install the at least one first platform package on the first logical partition for execution by the first logical partition. Also, the system may selectively perform operations corresponding to at least one second platform package from the registry of platform packages for the second logical partition and/or install the at least one second platform package on the second logical partition for execution by the second logical partition. In one or more embodiments, the first and second packages may be the same platform package or different platform packages.

In one embodiment, the system may perform operations corresponding to at least one platform package from the registry of platform packages for the first logical partition and the second logical partition.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

8. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    receiving, at a terminal, a plurality of messages, the receiving operation comprising:
        receiving, at the terminal via a first interface, a first subset of the plurality of messages destined for a first logical partition of a smart card;
        receiving, at the terminal via a second interface, a second subset of the plurality of messages destined for a second logical partition of the smart card;
    generating a message stream comprising the plurality of messages, the generating operation comprising:
        ordering the plurality of messages within the message stream in a chronological order based at least in part on a respective time at which each of the plurality of messages are received at the terminal; and
        inserting interface switch indicators corresponding respectively to each switch between (a) messages from the first subset of the plurality of messages, and (b) messages from the second subset of the plurality of messages in the message stream; and
    transmitting, by the terminal to the smart card, the message stream comprising the ordered plurality of messages with the inserted interface switch indicators.

2. The one or more non-transitory machine-readable media as recited in claim 1, wherein the first logical partition corresponds to a first subscriber identification module (SIM) card profile and the second logical partition corresponds to a second SIM card profile.

3. The one or more non-transitory machine-readable media as recited in claim 1, wherein the first logical partition corresponds to a first application executing on the smart card and the second logical partition corresponds to a second application executing on the smart card.

4. The one or more non-transitory machine-readable media as recited in claim 1, wherein the smart card is a Universal Integrated Circuit Card (UICC).

5. The one or more non-transitory machine-readable media as recited in claim 1, wherein the smart card is an integrated smart card or a removable smart card for a mobile handset.

6. The one or more non-transitory machine-readable media as recited in claim 1, wherein ordering the plurality of messages within the message stream in a chronological order based at least in part on the respective time at which each of the plurality of messages are received at the terminal comprises:
    grouping messages, from the first subset of the plurality of messages, received in a first period of time into a first group of messages;
    grouping messages, from the second subset of the plurality of messages, received in a second period of time into a second group of messages, wherein a start time of the second period of time is later than a start time of the first period of time;
    ordering the first group of messages prior to the second group of messages in the message stream, wherein at least one message in the second group of messages was received prior to at least one message in the first group of messages.

7. The one or more non-transitory machine-readable media as recited in claim 1, wherein the instructions, when executed by the one or more processors, further cause:
    receiving, at the smart card, the message stream comprising the ordered plurality of messages with the inserted interface switch indicators;
    transmitting a first group of the first subset of the plurality of messages to the first logical partition, the first group of the first subset of messages being ordered in the message stream prior to a first interface switch indicator;
    responsive to detecting the first interface switch indicator in the message stream: transmitting a first group of the second subset of messages in the plurality of messages to the second logical partition, the first group of the second subset of messages being ordered in the message stream between the first interface switch indicator and a second interface switch indicator; and responsive to detecting the second interface switch indicator in the message stream: transmitting a second group of the first subset of messages in the plurality of messages to the first logical partition, the second group of the first subset of messages being ordered in the message stream between the second interface switch indicator and a third interface switch indicator.

8. One or more non-transitory machine-readable media storing instructions which, when executed by one or more processors, cause:

receiving a message stream comprising a plurality of messages and interface switch indicators;

transmitting a first subset of messages in the plurality of messages to a first logical partition of a smart card, the first subset of messages being ordered in the message stream prior to a first interface switch indicator;

responsive to detecting the first interface switch indicator in the message stream: transmitting a second subset of messages in the plurality of messages to a second logical partition of the smart card, the second subset of messages being ordered in the message stream between the first interface switch indicator and a second interface switch indicator; and responsive to detecting the second interface switch indicator in the message stream: transmitting a third subset of messages in the plurality of messages to the first logical partition of the smart card, the third subset of messages being ordered in the message stream between the second interface switch indicator and a third interface switch indicator.

9. The one or more non-transitory machine-readable media as recited in claim 8, wherein the first logical partition corresponds to a first subscriber identification module (SIM) card profile and the second logical partition corresponds to a second SIM card profile.

10. The one or more non-transitory machine-readable media as recited in claim 8, wherein the first logical partition corresponds to a first application executing on the smart card and the second logical partition corresponds to a second application executing on the smart card.

11. The one or more non-transitory machine-readable media as recited in claim 8, wherein the smart card is a Universal Integrated Circuit Card (UICC).

12. The one or more non-transitory machine-readable media as recited in claim 8, wherein the smart card is an integrated smart card or a removable smart card for a mobile handset.

13. The one or more non-transitory machine-readable media as recited in claim 8, wherein the message stream is received from a terminal, wherein the plurality of messages are ordered within the message stream in a chronological order based at least in part on a respective time at which each of the plurality of messages were received at the terminal, and wherein at least one message in the second subset of messages was received at the terminal prior to at least one message in the first subset of messages.

14. The one or more non-transitory machine-readable media as recited in claim 8, wherein the instructions, when executed by the one or more processors, further cause:

receiving, at a terminal, the plurality of messages, the receiving operation comprising:
  receiving, at the terminal via a first interface, a first group of the plurality of messages destined for the first logical partition of the smart card;
  receiving, at the terminal via a second interface, a second group of the plurality of messages destined for the second logical partition of the smart card;
generating the message stream comprising the plurality of messages, the generating operation comprising:
  ordering the plurality of messages within the message stream in a chronological order based at least in part on a respective time at which each of the plurality of messages are received at the terminal; and
  inserting interface switch indicators corresponding respectively to each switch between (a) messages from the first group of the plurality of messages, and (b) messages from the second group of the plurality of messages in the message stream; and
transmitting, by the terminal to the smart card, the message stream comprising the ordered plurality of messages with the inserted interface switch indicators.

15. A system comprising:
at least one device including a hardware processor; the system being configured to perform operations comprising: receiving, at a terminal, a plurality of messages, the receiving operation comprising:
receiving, at the terminal via a first interface, a first subset of the plurality of messages destined for a first logical partition of a smart card;
receiving, at the terminal via a second interface, a second subset of the plurality of messages destined for a second logical partition of the smart card;
generating a message stream comprising the plurality of messages, the generating operation comprising:
ordering the plurality of messages within the message stream in a chronological order based at least in part on a respective time at which each of the plurality of messages are received at the terminal; and
inserting interface switch indicators corresponding respectively to each switch between (a) messages from the first subset of the plurality of messages, and (b) messages from the second subset of the plurality of messages in the message stream; and
transmitting, by the terminal to the smart card, the message stream comprising the ordered plurality of messages with the inserted interface switch indicators.

16. A method comprising:
receiving, at a terminal, a plurality of messages, the receiving operation comprising:
  receiving, at the terminal via a first interface, a first subset of the plurality of messages destined for a first logical partition of a smart card;
  receiving, at the terminal via a second interface, a second subset of the plurality of messages destined for a second logical partition of the smart card;
generating a message stream comprising the plurality of messages, the generating operation comprising:
  ordering the plurality of messages within the message stream in a chronological order based at least in part on a respective time at which each of the plurality of messages are received at the terminal; and
  inserting interface switch indicators corresponding respectively to each switch between (a) messages from the first subset of the plurality of messages, and (b) messages from the second subset of the plurality of messages in the message stream; and transmitting, by the terminal to the smart card, the message stream comprising the ordered plurality of messages with the inserted interface switch indicators.

17. A system comprising:
at least one device including a hardware processor;
the system being configured to perform operations comprising:
   receiving a message stream comprising a plurality of messages and interface switch indicators;
   transmitting a first subset of messages in the plurality of messages to a first logical partition of a smart card, the first subset of messages being ordered in the message stream prior to a first interface switch indicator;
   responsive to detecting the first interface switch indicator in the message stream:
      transmitting a second subset of messages in the plurality of messages to a second logical partition of the smart card, the second subset of messages being ordered in the message stream between the first interface switch indicator and a second interface switch indicator; and
   responsive to detecting the second interface switch indicator in the message stream: transmitting a third subset of messages in the plurality of messages to the first logical partition of the smart card, the third subset of messages being ordered in the message stream between the second interface switch indicator and a third interface switch indicator.

18. A method comprising:
   receiving a message stream comprising a plurality of messages and interface switch indicators;
   transmitting a first subset of messages in the plurality of messages to a first logical partition of a smart card, the first subset of messages being ordered in the message stream prior to a first interface switch indicator;
   responsive to detecting the first interface switch indicator in the message stream: transmitting a second subset of messages in the plurality of messages to a second logical partition of the smart card, the second subset of messages being ordered in the message stream between the first interface switch indicator and a second interface switch indicator; and
   responsive to detecting the second interface switch indicator in the message stream: transmitting a third subset of messages in the plurality of messages to the first logical partition of the smart card, the third subset of messages being ordered in the message stream between the second interface switch indicator and a third interface switch indicator.

* * * * *